United States Patent [19]

Inatome et al.

[11] Patent Number: 5,091,503
[45] Date of Patent: Feb. 25, 1992

[54] CONTINUOUS POLYMERIZATION DEVICE AND CONTINUOUS POLYMERIZATION METHOD

[75] Inventors: Hiroshi Inatome; Kazunari Inaguma; Hiroaki Yamaguchi; Yasuhisa Ohtani, all of Wakayama, Japan

[73] Assignee: Kao Corporation, Tokyo, Japan

[21] Appl. No.: 394,534

[22] Filed: Aug. 16, 1989

[30] Foreign Application Priority Data

Sep. 6, 1988 [JP] Japan .................. 63-223283

[51] Int. Cl.$^5$ .................................. C08G 63/00
[52] U.S. Cl. ........................ 528/272; 526/88; 526/317.1; 526/318.2; 526/318.42; 526/920; 422/131
[58] Field of Search .............. 526/88, 317.1, 318.2, 526/318.42, 920; 528/272; 422/131

[56] References Cited

U.S. PATENT DOCUMENTS

| | | | |
|---|---|---|---|
| 3,619,145 | 11/1971 | Crawford et al. | 422/234 |
| 4,460,278 | 7/1984 | Matsubara et al. | 366/149 |
| 4,591,487 | 5/1986 | Fritsch | 422/134 |

*Primary Examiner*—John Kight, III
*Assistant Examiner*—Sam A. Acquah
*Attorney, Agent, or Firm*—Birch, Stewart, Kolasch & Birch

[57] ABSTRACT

A continuous polymerization device is equipped with a stirring mechanism which possesses a drive shaft parallel to the direction of flow, a multiple number of polymerization precursor supply ports in the direction of flow, and at least one polymerization product output port at its latter portion, and possessing mixing capability with respect to the radial direction while possessing no actual mixing capability with respect to the direction of flow, in a continuous polymerization device which functions by piston flow.

4 Claims, 1 Drawing Sheet

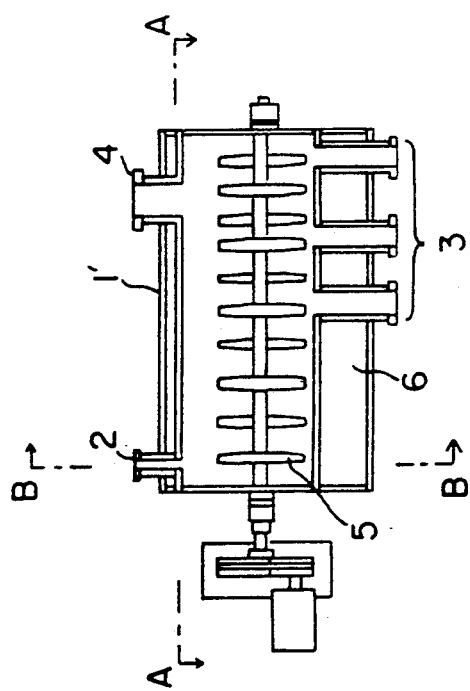
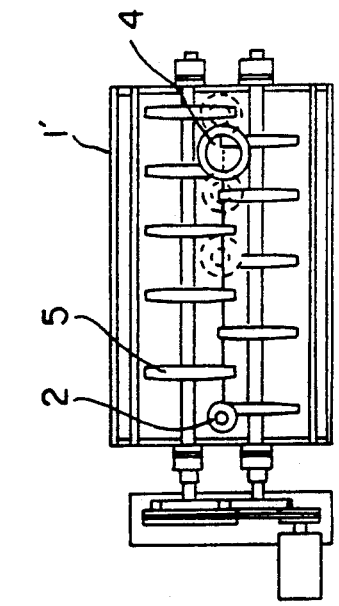
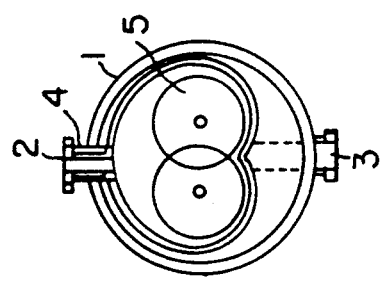
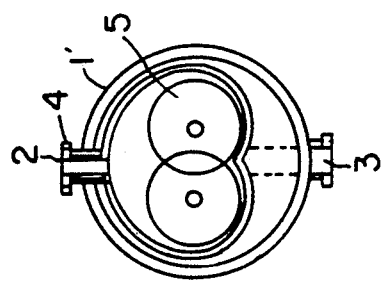
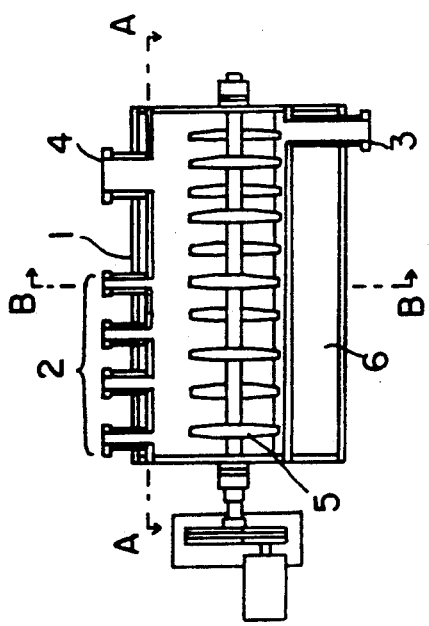

CONTINUOUS POLYMERIZATION DEVICE AND CONTINUOUS POLYMERIZATION METHOD

The present invention relates to a continuous polymerization device and continuous polymerization method. More specifically, the present invention relates to a device which controls the distribution of residence time of the polymerizing substances within the polymerization device during continuous polymerization, thereby allowing arbitrary control of the distribution of molecular weight of the polymerizing substances, as well as the polymerization method which is used by such device.

Although polymers have been conventionally prepared by batch or continuous methods, in either of these methods, the distribution of the molecular weight of the polymers is determined, based on the reaction engineering characteristics. Irrespective of the method, there were very few polymer preparation devices or polymer preparation methods in the past in which control of the distribution of molecular weight was possible. Even in cases in which this was possible, these involved contrivances which only narrowed the molecular weight distribution of the polymers, and there were no such devices or methods in which it was possible to easily prepare polymers in which the molecular weight was given a specific distribution. Therefore, in order to synthesize a polymer having a fixed molecular weight distribution, one had to either decide on a particular molecular weight by seeking out various polymerization conditions, or when it was still impossible to obtain the desired molecular weight distribution, polymerizing substances having the necessary molecular weights were polymerized by changing the reaction conditions. Following this, the polymerizing substances were made homogeneous by mixing at the required ratio of blending amounts to obtain a polymer compound having the desired molecular weight distribution. However, in these types of methods, even in the case of preparing only one type of polymer compound, several batches are required in the case of the batch method and several lines are required in the case of the continuous method. As such, the preparation method as well as the preparation process becomes quite complicated, which results in the production efficiency being lowered.

The present invention was completed as a result of earnest efforts on the part of the inventors to discover a rational and efficient method to obtain polymers having arbitrary molecular weight distribution in consideration of the state of the prior art as described above.

In other words, the present invention provides a continuous polymerization device which has the characteristic of being equipped with a stirring mechanism which possesses a drive shaft parallel to the direction of flow, a multiple number of polymerization precursor supply ports in the direction of flow, and at least one polymerization product output port at its latter portion, and possessing mixing capability with respect to the radial direction, while possessing no actual mixing capability with respect to the direction of flow, in a continuous polymerization device which functions by piston flow, as well as a continuous polymerization method which has the characteristic of continuously and separately supplying polymerization precursors from a multiple number of supply ports, and continuously stirring and transferring the polymerizing substances without back-mixing towards the polymerization product output port, followed by continuously removing the polymerization product from the output port located in a fixed location to obtain a polymerized substance for which the distribution of molecular weight has been controlled, using said continuous polymerization device.

In addition, the present invention provides a continuous polymerization device which has the characteristic of being equipped with a stirring mechanism which possesses a drive shaft parallel to the direction of flow, at least one polymerization precursor supply port, a multiple number of polymerization product output ports in the direction of flow, and a mixing device for said polymerization products, and possessing mixing capability with respect to the radial direction, while possessing no actual mixing capability with respect to the direction of flow, in a continuous polymerization device which functions by piston flow, as well as a continuous polymerization method which has the characteristic of continuously supplying polymerization precursor from a supply port, and continuously stirring and transferring the polymerizing substances without back-mixing towards the polymerization product output ports, followed by continuously and separately performing removal from a multiple number of polymerization product output ports, followed by mixing of said separately removed polymerization products to obtain a polymerized substance for which the distribution of molecular weight has been controlled, using said continuous polymerization device.

In the present invention, the polymerization precursor that is supplied to the continuous polymerization device is carried to the product output port by piston flow. Here, piston flow refers to the flow which moves by a difference in pressure between the entrance and exit or by a conveyance mechanism such as a screw, etc., in which mixing in a plane perpendicular to the direction of flow is sufficient, while mixing along the direction of flow (back-mixing) does not actually take place. In the present invention, the use of piston flow is essential in order to realize control of molecular weight distribution. This is because if back-mixing were to occur, control of the molecular weight distribution of the polymerized products would be difficult.

A stirring mechanism which satisfies the above-mentioned conditions is a mechanism in which back-mixing does not occur and which is used in bulk polymerization reactions. For example, it is possible to obtain especially favorable results by using a single-shaft forward direction screw and a multiple number of rotary disks, or a multi-shaft forward direction screw and a multiple number of rotary disks, etc. (a screw in which the threads are facing such that substances are transferred in the direction of flow during normal rotation is referred to as a forward direction screw).

BRIEF DESCRIPTION OF DIAGRAMS

FIG. 1 is a cross-sectional diagram which indicates one embodiment of the continuous polymerization device of the present invention, FIG. 2 is a cross-sectional diagram of the portion of FIG. 1 indicated with line A—A, and FIG. 3 is a cross-sectional diagram of the portion of FIG. 1 indicated with line B—B. In addition, FIG. 4 is a cross-sectional diagram which indicates another embodiment of the continuous polymerization device of the present invention, FIG. 5 is a cross-sectional diagram of the portion of FIG. 4 indicated with line A—A, and FIG. 6 is a cross-sectional diagram of the portion of FIG. 4 indicated with line B—B.

1', 1 Molecular Weight Distribution Control Device
2 Polymerization Precursor Supply Port
3 Polymerization Product Output Port
4 By-Product or Low Molecular Weight Volatile Substance Exhaust Port
5 Stirring Blade
6 Heat Transfer Medium Jacket The following is a description of the continuous polymerization device and continuous polymerization method of the present invention based on the accompanying diagrams.

FIG. 1 is a cross-sectional diagram which indicates one embodiment of the continuous polymerization device of the present invention. FIG. 2 is a cross-sectional diagram of the portion of FIG. 1 indicated with line A—A. FIG. 3 is cross-sectional diagram of the portion of FIG. 1 indicated with line B—B. This device (1) adjusts molecular weight by providing a multiple number of supply ports (2).

In addition, all of the devices indicated in FIGS. 1-3 mentioned above as well as in FIGS. 4-6 are equipped with stirring blades (5) which consist of a dual-shaft, multiple rotary disk stirring mechanism.

In device (1) which adjusts molecular weight by providing a multiple number of supply ports indicated in FIGS. 1-3, although the number of supply ports (2) is arbitrary, since there is no benefit in having an excess number and in consideration of the degree of ease of manipulating the distribution of the supplied amount of polymerization precursor and the balance with the number of stirring blades (5), it is preferable to have 2-30 such supply ports in the direction of flow. The intervals between supply ports (2) can be selected arbitrarily in accordance with the desired molecular weight distribution.

On the other hand, in device (1) which adjusts molecular weight by providing a multiple number of outlet ports indicated in FIGS. 4-6, since there is no effectiveness in having an excess number for reasons similar to those indicated above, it is preferable to have 2-20 such outlet ports in the direction of flow. The shortest interval between supply ports (2) and output ports (3) is a factor in determining the minimum value of molecular weight of the polymerized substance to be obtained, and as such, it is preferable that this interval not be too short in the case of the objective being to obtain a high molecular weight substance.

The distribution of the amount of polymerization precursor supplied from a multiple number of supply ports (2) is performed by using either of the supply ports from among the multiple number of supply ports (2) provided corresponding to the desired molecular weight distribution of the polymerized substance, and/or by flow control valves. Among a plurality of feeding ports, one or more ports may be used for controlling proportions of feeding amounts in the respective ports and reaching a desired distribution of the polymerization degree. In the same way, a plurality of taking ports (3) may be used for the same purpose. Removal from a multiple number of output ports (3) is completely identical to the above with control being performed corresponding to the desired molecular weight distribution of the polymerized substance. However, in this case, in order to mix each of the individual polymerization products from the output ports, a mixing mechanism such as conical screw mixer and a cooling crusher are needed in subsequent operations.

In addition, in the case of condensation polymerization, since low molecular weight by-products such as water and alcohol are produced, heating and extraction mechanisms are required in order to remove these In the device indicated in the diagrams, exhaust port (4) is provided as the extraction mechanism for such by-products or low molecular weight volatile substances. For heating, a heat transfer mechanism such as heat transfer medium jacket (6) may be attached outside of the polymerization device and/or in the stirring shaft. This type of heat transfer mechanism can also be used for heat removal in the case of radical polymerization, etc. Together with providing a degassing port exclusively for the removal of low molecular weight by-products like those mentioned above, suction ports for reducing pressure and transfer gas intake ports for transferring gas to be removed can also be provided as necessary.

In addition to controlling vessel temperature, pressure, balance of amounts supplied and balance of amounts of polymerization products removed, control of the molecular weight distribution of the polymerization products can also be performed by changing the speed of rotation of the mixing and transfer mechanism.

EMBODIMENTS

The term, "parts", is based on weight.

EMBODIMENT 1

A polyester polymer having a specific, desired molecular weight distribution was able to be prepared by using horizontal-type continuous polymerization device I in which the vessel volume was 40 liters, the total length inside the reaction vessel was 800 mm, and the inner diameter was 250 mm. In addition, 10 polymerization precursor supply ports were provided in the upper portion of the device at intervals of 50 mm from the entrance of the device. Further, the device was equipped with a degassing port on the top portion of the exit portion at the end of the reaction vessel, and was also equipped with dual-shaft rotary disks for the stirring blades.

In the polymerization of this polyester, reaction vessel II (capacity: 40 liters) and mixing device III were provided in front of continuous polymerization device I to carry out preliminary reactions.

In this polyester polymerization reaction, an esterification reaction was continuously carried out by continuously adding 29.4 parts of adipic acid as the acid component, 70.6 parts of polyoxypropylene(2.2)-2,2-bis(4-hydroxyphenyl)propane as the alcohol component, and 0.1 parts of antimony oxide as the reaction catalyst to reaction vessel II so as to yield a total volume of 10 kg/hr.

The reaction temperature of this esterification process was 250° C., the pressure was 220 mmHg and the average retention time was 2 hours. This was continuously introduced into mixing device III and anhydrous trimellitic acid was continuously added and mixed at a flow ratio of 10 parts to 100 parts of the polymerization precursor.

For the continuing reaction in the high viscosity region, the polymerization precursor that was uniformly mixed in mixing device III was added from the supply port located immediately next to the entrance of horizontal-type polymerization vessel I and the supply port provided at a weight ratio was 70:30.

During this time, the temperature of continuous polymerization vessel I was maintained at 220° C. and the pressure inside the vessel was maintained at 50 mmHg. In addition, the average retention time was 1.7 hours.

In this manner, a polyester resin was obtained having a desired molecular weight distribution in which the softening point was 114° C., the number average molecular weight was 4100, the weight average molecular weight was 51000 and the dispersion index, which indicates the spread of molecular weight distribution (the ratio of weight average molecular weight and number average molecular weight), was 12.4.

EMBODIMENT 2

A polyester polymer having a specific, desired molecular weight distribution was able to be prepared by using horizontal-type continuous polymerization device IV in which the vessel volume was 40 liters, the total length inside the reaction vessel was 800 mm, and the inner diameter was 250 mm. In addition, 10 outlet ports were provided in the lower portion of the device at intervals of 50 mm moving from the exit to the entrance of the device. Further, the device was equipped with a degassing port on the top portion of the exit portion at the end of the reaction vessel, and was also equipped with dual-shaft rotary disks for the stirring blades.

In the same manner as Embodiment 1, reaction vessel II (capacity: 40 liters) and mixing device III were provided in front of horizontal-type continuous polymerization device IV to carry out preliminary reactions.

In this polyester polymerization reaction, an esterification reaction was continuously carried out by continuously adding the same acid component, alcohol component and reaction catalyst as those of Embodiment 1 while mixing to reaction vessel II at the same composite ratio as that of Embodiment 1. The reaction temperature of this esterification process was 250° C., the pressure was 220 mmHg and the average retention time was 2 hours. This was continuously introduced into mixing device III and anhydrous trimellitic acid was continuously added and mixed at a flow ratio of 10 parts to 100 parts of the polymerization precursor. The reaction in the high viscosity region was then carried out continuously by introducing this polymerization precursor mixture into horizontal-type continuous polymerization device IV which was maintained at a temperature of 220° C. and a vessel pressure of 50 mmHg. The polymerized substances were continuously removed from outlet ports provided at locations 400, 600 and 800 mm, respectively, from the entrance at a weight ratio of 20:50:30. The average retention time in horizontal-type continuous polymerization device IV of the polyester resin that was removed was 1.55 hours.

Each of the respective resins were cooled and solidified and mixed following crushing in a conical screw mixer. As a result, a polyester resin was obtained having a desired molecular weight distribution in which the softening point was 112° C. the number average molecular weight was 4400, the weight average molecular weight was 48000 and the dispersion index was 10.9.

COMPARATIVE EXAMPLE

A polyester resin was obtained by continuously polymerizing the polymerization precursor obtained from mixing vessel III in Embodiment 1 using the horizontal-type continuous polymerization device in which the vessel volume was 40 liters, the total length inside the vessel was 800 mm, the inner diameter was 250 mm. The device was equipped with a degassing port at the top portion of the exit portion at the end of the reaction vessel, and was also equipped with dual-shaft, rotary disks for the stirring blades. In this horizontal-type continuous polymerization device, distribution and supply of the polymerization precursor, as well as separate removal of the polymer was not performed. The device was operated continuously at a polymerization temperature of 220° C., a vessel pressure of 50 mmHg, for an average retention time of 1.2 hours. Although the polyester resin that was obtained in this manner exhibited a softening point of 113° C. which was nearly the same as that of Embodiment 1, the resulting polymer had a number average molecular weight of 12000, a weight average molecular weight of 49000 and a dispersion index of 4.1 indicating a polymer of narrow molecular weight distribution. Thus, a resin having the desired molecular weight distribution was unable to be obtained.

We claim:

1. A continuous polymerization device which has the characteristic of being equipped with a stirring mechanism which possesses a drive shaft parallel to the direction of flow, a multiple number of polymerization precursor supply ports in the direction of flow, and at least one polymerization product output port at its latter portion, and possessing mixing capability with respect to the radial direction while possessing no actual mixing capability with respect to the direction of flow, in a continuous polymerization device which functions by piston flow.

2. A continuous polymerization device which has the characteristic of being equipped with a stirring mechanism which possesses a drive shaft parallel to the direction of flow, at least one polymerization precursor supply port, a multiple number of polymerization product output ports in the direction of flow, and a mixing device for said polymerization products, and possessing mixing capability with respect to the radial direction while possessing no actual mixing capability with respect to the direction of flow, in a continuous polymerization device which functions by piston flow.

3. A continuous polymerization method which has the characteristic of continuously and separately supplying polymerization precursors from a multiple number of supply ports, and continuously stirring and transferring the polymerizing substances without back-mixing towards the polymerization product output port, followed by continuously removing the polymerization product from the output port located in a fixed location using the continuous polymerization device as claimed in claim 1.

4. A continuous polymerization method which has the characteristic of continuously supplying polymerization precursor from a supply port, and continuously stirring and transferring the polymerizing substances without back-mixing towards the polymerization product output ports, followed by continuously and separately performing removal from a multiple number of polymerization product output ports, followed by mixing of said separately removed polymerization products using the continuous polymerization device as claimed in claim 2.

* * * * *